A. ST JEAN AND I. LAFLEUR.
AUTOMOBILE SIGNAL.
APPLICATION FILED MAY 4, 1922.
1,426,612.
Patented Aug. 22, 1922.
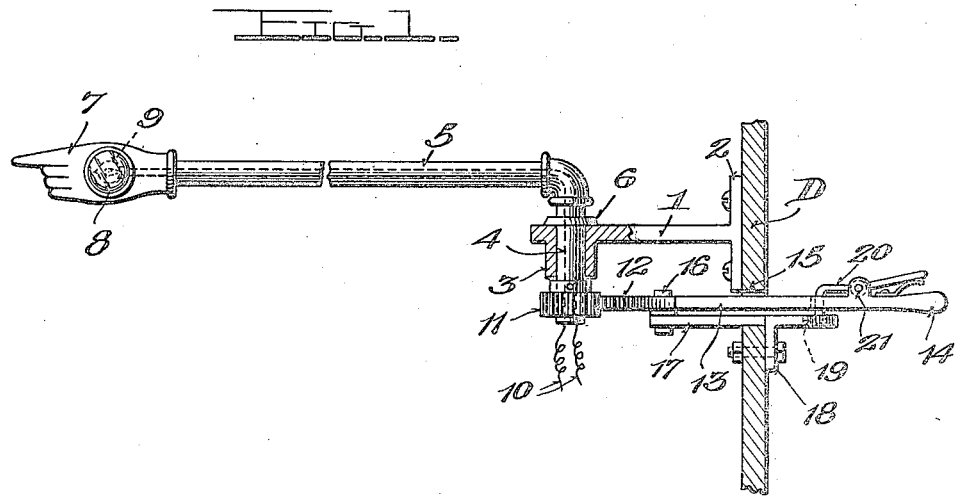
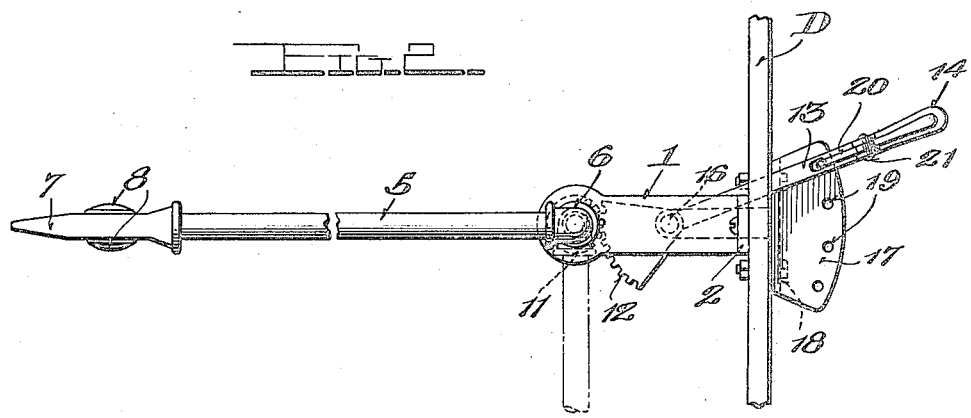
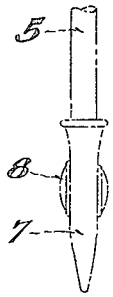
Inventors
Arthur St Jean and
Isaie Lafleur
By ○○○○○○ Attorney

UNITED STATES PATENT OFFICE.

ARTHUR ST. JEAN AND ISAIE LAFLEUR, OF NEW BEDFORD, MASSACHUSETTS.

AUTOMOBILE SIGNAL.

1,426,612.  Specification of Letters Patent.  Patented Aug. 22, 1922.

Application filed May 4, 1922. Serial No. 558,432.

*To all whom it may concern:*

Be it known that we, ARTHUR ST. JEAN and ISAIE LAFLEUR, citizens of the United States, residing at New Bedford, in the county of Bristol and State of Massachusetts, have invented certain new and useful Improvements in Automobile Signals, of which the following is a specification.

This invention relates to certain new and useful improvements in automobile signals, and the primary object thereof is to provide a signal of this type which is formed for mounting on the front side of the dashboard and which is operable from the rear side of the dashboard so as to be easily and quickly swung to project outwardly from either side of the automobile body thereby to indicate the direction of movement of the automobile.

A further object of the invention is to provide a signal in which the indicator may be illuminated at night and to provide novel means for affording such illumination.

A still further object of the invention is to provide novel means of a simple and compact nature for enabling manual operation of the indicator and for latching the latter in different positions, and to also provide means of a novel form for securing the device in position on the dash board.

Further and other objects will be later set forth and manifested in the course of the following description.

In the drawings:

Figure 1, is a side elevation, partly in section showing the invention mounted on the dashboard, and Figure 2, is a top plan view.

In proceeding in accordance with the present invention a bracket is provided having a horizontal body 1 provided with an attaching member 2 that is secured to the front face of the dashboard D of the automobile. The body 1 is formed with a depending bearing 3 in which is mounted the vertical end 4 of the indicator arm 5, the latter being of approximately L-shape. The arm 5 is formed of tubing and has a collar 6 or the like which engaging the body 1 limits downward movement of the arm while still permitting of free rotation thereof in the bearing 3. An indicator proper preferably in the form of a hollow member 7 shaped to simulate the human hand is suitably connected to the outer free end of the arm 5 and is provided with transparent sides or parts 8. An electric bulb 9 is suitably mounted in the member 7 and has wires 10 connected thereto, the wires being included in the automobile lighting system and extending through the interior of arm 5 and through the end 4 thereof. A pinion 11 is suitably secured to the depending end 4 of the arm 5 and is disposed below the bearing 3 so as to limit upward movement of the end 4 with respect to the bracket. The pinion 11 is in mesh with a segmental gear 12 formed on one end of a lever 13, the latter having a handle 14 on its opposite end. The lever 13 extends through a slot 15 provided therefor in the dashboard D and is pivoted at 16 to the body 17 of a second or lower bracket disposed beneath the first named bracket. The body of the bracket 17 extends through the slot 15 and has a depending attaching arm or member 18 suitably secured to the rear face of the dashboard D. The rear end of the body 17 of the lower bracket projects rearwardly of the dashboard D and is formed with a series of apertures 19 to selectively receive therein the nose of a spring tensioned latch or catch 20 which is pivoted at 21 to the handle of the lever.

In operation the driver grasps the lever and at the same time depresses the handle of the catch or latch to thereby release the lever and then moves the lever to the right or left according to the direction which the automobile is to take thereby effecting corresponding movement of the arm and the indicator. Normally the indicator arm points straight ahead and is held in all of its various positions by the latch or catch.

What is claimed is:

1. In an automobile signal, in combination with the automobile dashboard having a slot therein, a bracket above the slot secured to the front of the dashboard and having a vertical bearing, a hollow L-shaped arm having an indicator on its front end and having its opposite end journaled in the bearing, means to illuminate the indicator including wires extending through the arm and below the bracket, a second bracket secured to the dashboard and having a body extending through the dashboard slot, a pinion below the bearing secured to the said opposite end of the arm, a lever extending through the dashboard slot and pivoted to the front end of the body of the second bracket and meshed with said pinion, the rear end of the body of the second bracket having a series of spaced openings, and a latch on the rear end of the lever engageable in a selected one of the openings of the body of the second bracket.

2. In an automobile signal, in combination with the slotted dashboard of an automobile, a bracket secured to the dashboard above the slot thereof, an indicator arm pivoted to the bracket and having a pinion thereon, a second bracket secured to the dashboard and having its body extending through the slot so that the ends of the body extend respectively on opposite sides of the dashboard, a lever extending through the dashboard slot and pivoted on the second bracket and having a segmental rack on its front end meshed with the pinion of the indicator arm and a latch on the rear end of the lever engageable with the rear end of the body of the second bracket to hold the lever in predetermined latched position.

3. In an automobile signal, in combination with the slotted dashboard of an automobile, a bracket secured to the dashboard, an indicator arm pivoted to the bracket, a second bracket secured to the dashboard and having parts extending through the slot, an operating lever pivoted on the front part of the second bracket and extending through the slot, means to operate the arm by said lever, and latching means between the lever and the rear part of the second bracket to latch the lever in different positions.

4. In an automobile signal, in combination with the slotted dashboard of an automobile, a bracket secured to the dashboard, an indicator arm movably mounted on the bracket, a second bracket secured to the dashboard and extending through the slot, means on the second bracket extending through the slot to actuate the arm, and means to latch the actuating means to the second bracket at points rearwardly of the dashboard.

5. In combination with the dashboard of an automobile, a pivoted indicator arm, means to support the arm in front of the dashboard, a bracket, means to support the bracket so that same has a part extending in front of and a part extending to the rear of the dashboard, operating means connected to the front part of the bracket and engaged with the arm to actuate the latter, and latching means between the operating means and the rear part of the bracket to hold the arm in different positions.

In testimony whereof we affix our signatures.

ARTHUR ST. JEAN.
ISAIE LAFLEUR.